(12) United States Patent
Del Toro

(10) Patent No.: US 9,848,595 B1
(45) Date of Patent: Dec. 26, 2017

(54) INSECT NET WITH EMERGENCY DEPLOYMENT

(71) Applicant: Ernesto Vasquez Del Toro, Big Foot, TX (US)

(72) Inventor: Ernesto Vasquez Del Toro, Big Foot, TX (US)

( * ) Notice: Subject to any disclaimer, the term of this patent is extended or adjusted under 35 U.S.C. 154(b) by 0 days.

(21) Appl. No.: 15/380,031

(22) Filed: Dec. 15, 2016

(51) Int. Cl.
| | | |
|---|---|---|
| *A01M 29/00* | (2011.01) | |
| *A01M 29/34* | (2011.01) | |
| *E06B 9/52* | (2006.01) | |
| *B62D 33/06* | (2006.01) | |
| *E06B 9/54* | (2006.01) | |

(52) U.S. Cl.
CPC ............ *A01M 29/34* (2013.01); *B62D 33/06* (2013.01); *E06B 9/521* (2013.01); *E06B 9/522* (2013.01); *E06B 2009/543* (2013.01)

(58) Field of Classification Search
CPC ........ A01M 29/34; B62D 33/06; E06B 9/521; E06B 9/522
USPC ....................................... 296/190.01, 190.03
See application file for complete search history.

(56) References Cited

U.S. PATENT DOCUMENTS

| | | |
|---|---|---|
| 499,965 A | 6/1893 | Bushnell |
| 2,784,409 A | 3/1957 | Slipakoff |
| 3,288,157 A | 11/1966 | Szkolny |
| 3,498,305 A | 3/1970 | Hulin |
| 4,224,754 A | 9/1980 | Derryberry |
| 4,825,578 A | 5/1989 | Robinson |
| 5,351,738 A | 10/1994 | Petersen et al. |
| 5,438,705 A | 8/1995 | Mendez et al. |
| 5,571,247 A | 11/1996 | Butler |
| 7,147,263 B2 | 12/2006 | Schneidau et al. |
| 7,354,092 B2 | 4/2008 | Showalter et al. |
| 7,921,863 B2 | 4/2011 | Ways |
| 8,061,377 B2 | 11/2011 | Vestergaard Frandsen |
| 8,123,279 B2 | 2/2012 | Orr et al. |
| 8,308,223 B2 | 11/2012 | King |
| 8,695,859 B1 | 4/2014 | Stalker et al. |
| 8,888,163 B1 | 11/2014 | Johnson |
| 2005/0274060 A1* | 12/2005 | Lederle .................. A01M 1/24 43/132.1 |
| 2009/0241410 A1 | 10/2009 | Baird, III |
| 2010/0066118 A1 | 3/2010 | Miller et al. |

* cited by examiner

*Primary Examiner* — Joseph D. Pape
(74) *Attorney, Agent, or Firm* — Kammer Browning PLLC

(57) ABSTRACT

An insect net with emergency deployment structured to be retrofit onto the roof of the cab of the typical construction or agricultural equipment vehicle. The system includes a cylindrical insect net that may be compressed into a closed deployment box positioned on the underside of the vehicle cab roof. A deployment cord is positioned adjacent the operator where it may be readily accessed and pulled to open the doors of the deployment box to allow the cylindrical net to drop (under the influence of a ring of small weights) to surround the operator within the cab. The system is structured to be re-used by replacing the cylindrical net back into the deployment box and refitting the deployment cord with pull pin to hold the deployable components within the box for subsequent use.

11 Claims, 2 Drawing Sheets

INSECT NET WITH EMERGENCY DEPLOYMENT

BACKGROUND OF THE INVENTION

1. Field of the Invention

The present invention relates generally to safety attachments and accessories for construction equipment and other open cab vehicles. The present invention relates more specifically to devices for protecting construction equipment operators against sudden attack by flying insects that may have been disturbed during operation of the construction equipment.

2. Description of the Related Art

Protecting the operator of construction equipment and other open cab vehicles generally focuses on providing structural rollover protection as well as protection from sun and rain. A further safety concern that has generally not been addressed in the industry is that of protecting the construction equipment operator from sudden attack by flying insects that might have been disturbed during operation of the construction equipment. Such concerns are particularly relevant as they relate to bees and disturbed bee hives that might be encountered on a construction site or in an agricultural field.

Under normal circumstances, the preference of construction and agricultural equipment operators is to be operating the vehicle within a top covered but otherwise open cab. Most small to medium sized construction and agricultural equipment vehicles do not have closed and air-conditioned cabs. These most common types of equipment therefore operate most often with an open cab that may at best be structured with a rigid roof to protect against sun and rain, and to some extent to protect the operator in the event of equipment rollover. Even where the likelihood of sudden insect attack is high, operators generally prefer to control the vehicle from an open cab environment.

It would be desirable, therefore, to have an emergency system that could protect the equipment operator from a sudden attack of flying insects, such as might have been disturbed on the construction site or in the agricultural field. It would be desirable if such a system were unobtrusive and stored out of the way when not required, and yet be readily accessible to the operator on a moment's notice when the emergency arises. It would be desirable if such a system could be retrofit into the cab structure of existing construction equipment or agricultural equipment in such a manner that provides both ready access and full coverage for the operator when a sudden insect attack occurs.

SUMMARY OF THE INVENTION

The present invention provides an insect net with emergency deployment structured to be retrofit onto the roof of the cab of the typical construction or agricultural equipment vehicle. The system includes a cylindrical insect net that may be compressed into a closed deployment box positioned on the underside of the vehicle cab roof. A deployment cord is positioned adjacent the operator where it may be readily accessed and pulled to open the doors of the deployment box to allow the cylindrical net to drop (under the influence of a ring of small weights) to surround the operator within the cab. The system is structured to be re-used by replacing the cylindrical net back into the deployment box and refitting the deployment cord with pull pin to hold the deployable components within the box for subsequent use.

DETAILED DESCRIPTION OF THE PREFERRED EMBODIMENT

Figure 1:
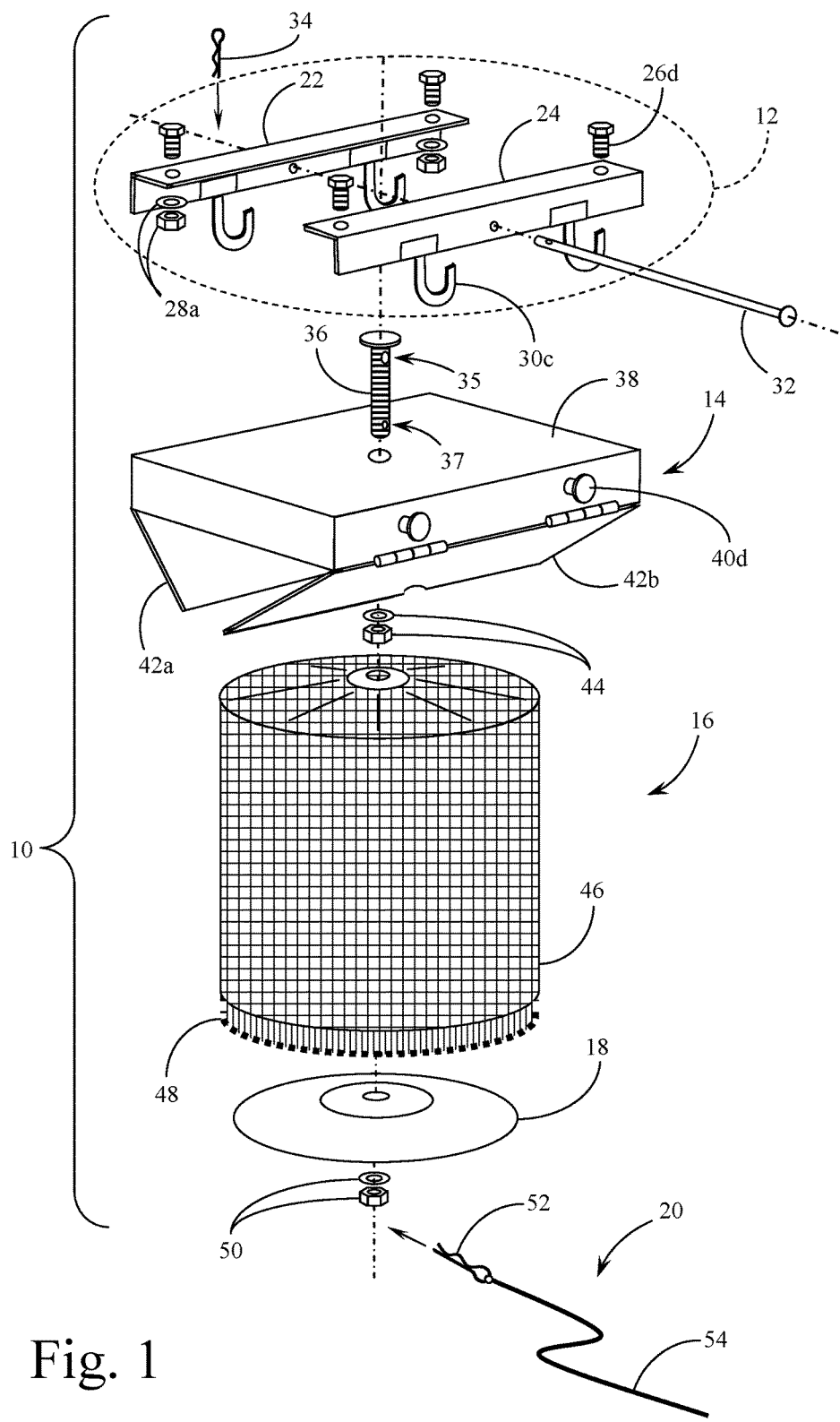
FIG. 1 is an exploded assembly perspective view of the insect net deployment system of the present invention disclosing its structure and the manner of assembling the components.

FIG. 1 shows the entire system of the present invention in an exploded assembly view with all of the various components that make up the system as they would be installed on the roof of the cab of a construction vehicle. Net deployment system 10 is generally made up of five basic components, including: mounting bracket assembly 12, deployment box enclosure 14, insect net barrier 16, disk net spreader 18, and deployment mechanism 20.

Mounting bracket assembly 12 generally comprises two sub-assemblies structured as first roof bracket 22 and second roof bracket 24. Each of these two roof brackets 22 & 24 are attached to the roof of the construction vehicle cab (see FIG. 2) with bracket mounting bolts 26a-26d which are in turn connected to bracket mounting washers and nuts 28a-28d. These brackets 22 & 24 are appropriately positioned and secured through holes drilled in the roof of the construction vehicle cab. Appropriate sealing of the holes for weather-proofing is anticipated. An additional component of mounting bracket assembly 12 is assembly safety retention rod 32 which is a long narrow rod that extends through aligned apertures in first roof bracket 22 and second roof bracket 24 after passing through safety rod aperture 35 in primary support bolt 36. Safety rod cotter pin 34 is then placed through an aperture in the end of assembly safety retention rod 32 in order to secure everything below the bracket assembly to the roof of the vehicle cab above the equipment operator.

Deployment box enclosure 14 is generally constructed of deployment box base 38 with sides that position a number of hanger posts 40a-40d. Hanger posts 40a-40d engage and are held by corresponding bracket hangers 30a-30d on mounting bracket assembly 12. Deployment box doors 42a & 42b are hinged onto deployment box base 38 and each define one-half of a central aperture through which primary support bolt 36 extends. Before deployment box doors 42a & 42b are closed, deployment box retention washer and nut 44 are secured to primary support bolt 36 below safety rod aperture 35 thereon. Insect net barrier 16 is then secured onto primary support bolt 36 through a central aperture in the top of the generally cylindrical insect net wall material 46 which extends down to insect net weighted perimeter 48.

The interior (top wall) of insect net barrier 16 is held up within deployment box enclosure 14 with disk net spreader 18 which serves to maintain the cylindrical shape of the net and prevents it from falling into a closed configuration over the equipment operator. Disk net spreader 18 is incrementally smaller in diameter than the diameter of insect net wall material 46 so that on deployment insect net weighted perimeter 48 draws the net down around disk net spreader 18 and over the operator of the construction vehicle seated below. Deployment disk washer and nut 50 secure deployment disk net spreader 18 to primary support bolt 36. After insect net wall material 46 is pulled up into deployment box enclosure 14, deployment cotter pin 52 is inserted into deployment pin aperture 37 of primary support bolt 36 where it retains doors 42a & 42b in a closed configuration until activated by the user. The user activates net deployment system 10 by pulling on deployment pull cord 54 which pulls deployment cotter pin 52 from deployment pin aperture 37 of primary support bolt 36 to release doors 42a & 42b to allow insect net barrier 16 to deploy under the force of gravity.

Figure 2:
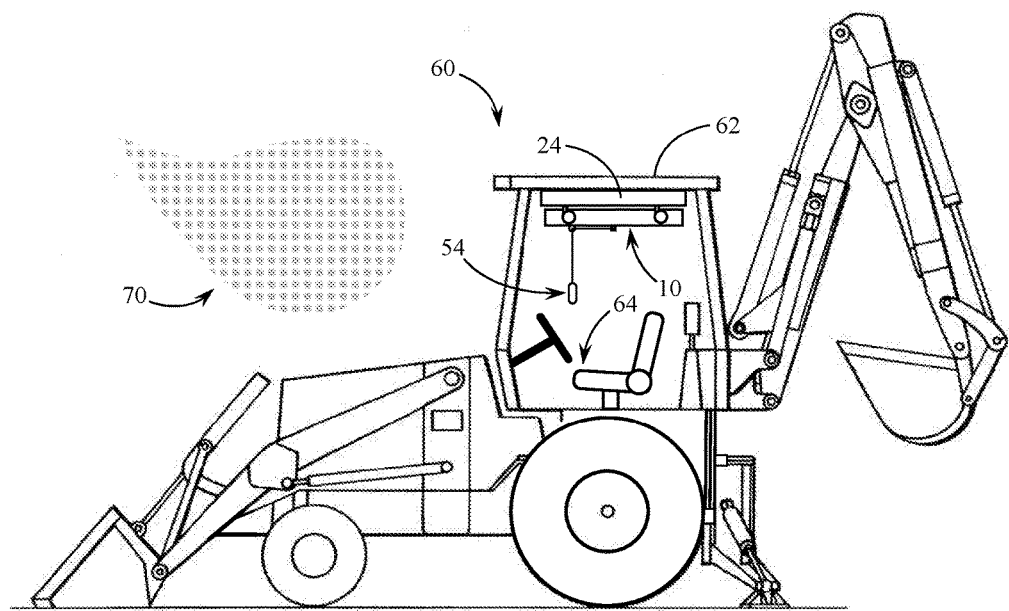
FIG. 2 is an elevational side view of a typical piece of construction equipment (a back hoe) that has been retrofit with the system of the present invention, about to experience a flying insect attack.

Reference is next made to FIG. 2 which provides an elevational side view of a typical piece of construction equipment (vehicle) showing the typical open cab configuration and implementing the system of the present invention. Construction vehicle 60 in the example shown is a typical back hoe with cab roof 62 supporting the structures of the present invention as described above. Other types of construction equipment and agricultural equipment with similar cab configurations are appropriate for use with the system of the present invention. In FIG. 2, flying insect swarm 70 is approaching the vehicle 60 in a manner that would require the emergency deployment of the system of the present invention. The operator of construction vehicle 60 would be seated in operator chair 64 centrally located within the structure of the cab immediately under cab roof 62. Net deployment system 10 is shown in place on the underside of cab roof 62 supported in this instance by first and second roof brackets 22 & 24. Second roof bracket 24 is visible in the view of FIG. 2. Deployment pull cord 54 is shown positioned adjacent operator seat 64 at a location readily accessible to the operator.

Figure 3A:
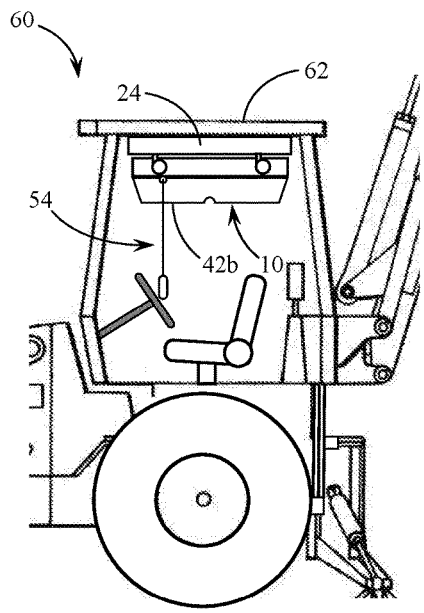
FIG. 3A is a detailed elevational view of the cab of the construction vehicle shown in FIG. 2 with the system of the present invention being initially deployed with the deployment box doors partially open.

By pulling on deployment pull cord 54 the operator initiates the deployment of the system as shown in FIG. 3A. Pulling on deployment pull cord 54 removes the deployment cotter pin 52 from the primary support bolt 36 as shown and described above in FIG. 1. This allows deployment box doors 42a & 42b to open and drop down on hinges to fully expose the cylindrical net of the present invention. Deployment box door 42b is visible in FIG. 3A as it begins to drop down and open the system.

Figure 3B:
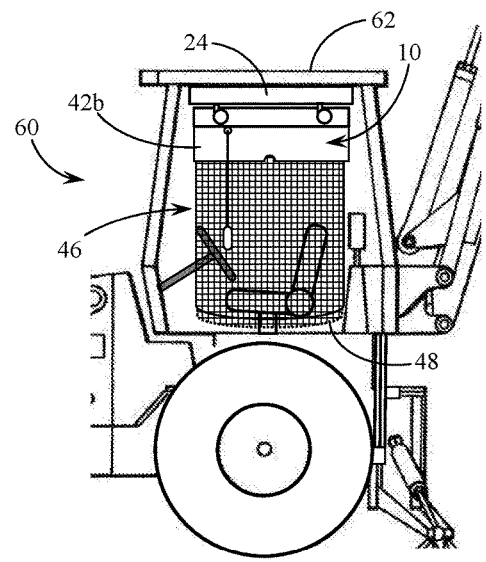
FIG. 3B is a detailed elevational view of the cab of the construction vehicle shown in FIG. 2 with the system of the present invention fully deployed so as to surround the operator of the vehicle seated in the cab.

FIG. 3B shows the subsequent deployment of the system of the present invention with deployment box door 42b fully open and insect net wall material 46 with insect net weighted perimeter 48 dropping down to fully surround (in a cylindrical enclosure) the operator of the vehicle. It is anticipated that the cylindrical structure of the net material is large enough to surround the operator and the operator seat 64 with consideration given for a steering wheel or other control components within the cab of the vehicle. The flexibility of the net material allows for some variation in the structures within the cab enclosure of the vehicle that might otherwise prevent full deployment of the cylindrical net.

Although the system of the present invention may be sized according to the requirements of any number of different pieces of construction or agricultural equipment, as well as the size of the cab roofs associated with such equipment, the typical system would be manufactured with a deployment box approximately four inches deep and two feet by two feet in configuration. Such a deployment box would provide adequate room to store a cylindrical net structure two feet in diameter and anywhere from four feet to eight feet in length. As indicated above, the system of the present invention is designed to be reloaded with the cylindrical net being lifted back up into the deployment box for further use. Preferably, the system is first removed from the roof of the vehicle by lifting the hanger posts of the system off of the bracket hangers that are more permanently fixed to the roof of the vehicle. By removing the deployment box from the cab roof, the replacement of the net into the deployment box and the reloading of the deployment system (pull cord and cotter pin) are made easier.

Although the present invention has been described in connection with certain preferred embodiments, those skilled in the art will recognize that minor modifications to the size and structure of the system may be made to accommodate different construction and agricultural vehicles without departing from the spirit and scope of the basic invention.

I claim:

1. A system for the rapid deployment of an insect barrier around an operator of an open cab vehicle, the open cab vehicle having a cab roof positioned over an area where the operator sits or stands, the system comprising:
    a collapsible insect net wall forming a cylindrical net when extended, the cylindrical net having an upper edge and a lower edge;
    a deployment enclosure positioned on an underside of the cab roof, the deployment enclosure comprising at least one trap door serving to open and close the enclosure, the collapsible insect net wall positioned within the deployment enclosure with the upper edge of the cylindrical net secured within the enclosure and the lower edge of the cylindrical net loose within the enclosure and held in place by the at least one trap door, and
    a trap door latch positioned to alternately secure the at least one trap door closed or allow the at least one trap door to open.

2. The system of claim 1 wherein the trap door latch comprises:
    a bolt extending from a generally central position within the deployment enclosure, the bolt extending through an aperture in the at least one trap door and having a pin hole through a lower end of the bolt;
    a removable latch pin inserted through the pin hole in the lower end of the bolt; and
    a deployment pull cord attached to the latch pin and extending to a point within reach of the operator.

3. The system of claim 1 wherein the cylindrical net further comprises a plurality of weights positioned on the lower edge thereof.

4. The system of claim 1 further comprising a fixed disk net spreader centrally positioned within the deployment enclosure, the fixed disk net spreader at least partially securing the upper edge of the cylindrical net, wherein the fixed disk net spreader has a diameter smaller than a diameter of the cylindrical net when the net is deployed such that the lower edge of the cylindrical net drops down and around the fixed disk net spreader.

5. The system of claim 1 further comprising at least one mounting bracket for securing the deployment enclosure to the underside of the cab roof, the mounting bracket fixed to the cab roof and having one or more hangers for holding the deployment enclosure.

6. The system of claim 5 wherein the one or more hangers comprise open hooks and wherein the deployment enclosure further comprises one or more hanger posts, the one or more hangers engaging the one or more hanger posts to hold the deployment enclosure.

7. The system of claim 6 wherein the at least one mounting bracket comprises a first roof angle bracket and a second roof angle bracket configured parallel to and spaced from each other in a generally rectangular arrangement and the one or more hangers comprise four hangers generally positioned on the first and second roof angle brackets spaced apart at four corners of the rectangular arrangement, and wherein further, the one or more hanger posts comprise four hanger posts aligned on the deployment enclosure to engage the four hangers.

8. The system of claim 5 wherein the trap door latch comprises:
- a bolt extending from a generally central position within the deployment enclosure, the bolt extending through an aperture in the at least one trap door and having a pin hole through a lower end of the bolt;
- a removable latch pin inserted through the pin hole in the lower end of the bolt; and
- a deployment pull cord attached to the latch pin and extending to a point within reach of the operator.

9. The system of claim 8 wherein the bolt further comprises an upper end having a pin hole there through, the upper pin hole comprising an aligned aperture for receiving a safety securement pin, the safety securement pin removably inserted into further aligned apertures in the at least one mounting bracket, wherein the safety securement pin may be fully inserted through the aligned apertures when the deployment enclosure is positioned under the at least one mounting bracket, on the one or more hangers.

10. The system of claim 4 wherein the trap door latch comprises:
- a bolt extending from a generally central position within the deployment enclosure, the bolt extending through an aperture in the at least one trap door and having a pin hole through a lower end of the bolt;
- a removable latch pin inserted through the pin hole in the lower end of the bolt; and
- a deployment pull cord attached to the latch pin and extending to a point within reach of the operator.

11. The system of claim 10 wherein the bolt further comprises a mid-section having at least one nut positioned thereon, the at least one nut securing and holding the fixed disk net spreader.

* * * * *